United States Patent
Felke et al.

(10) Patent No.: US 8,195,595 B2
(45) Date of Patent: Jun. 5, 2012

(54) PREDICTION OF FUNCTIONAL AVAILABILITY OF COMPLEX SYSTEM

(75) Inventors: Timothy J. Felke, Glendale, AZ (US); George D. Hadden, Plymouth, MN (US); David M. Kolbet, Scottsdale, AZ (US); Randy Magnuson, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 1009 days.

(21) Appl. No.: 12/165,440

(22) Filed: Jun. 30, 2008

(65) Prior Publication Data

US 2009/0327202 A1    Dec. 31, 2009

(51) Int. Cl.
*G06F 9/44* (2006.01)
*G06N 7/02* (2006.01)
*G06N 7/06* (2006.01)

(52) U.S. Cl. .......................... 706/52; 706/900

(58) Field of Classification Search .................. 706/1, 2, 706/52, 900, 903; 700/1, 28
See application file for complete search history.

(56) References Cited

U.S. PATENT DOCUMENTS

| | | | |
|---|---|---|---|
| 5,130,936 A | 7/1992 | Sheppard et al. |
| 5,191,638 A | 3/1993 | Wakami et al. |
| 5,249,269 A | 9/1993 | Nakao et al. |
| 5,285,376 A | 2/1994 | Struger et al. |
| 5,668,356 A | 9/1997 | Powell et al. |
| 5,812,526 A | 9/1998 | Chang et al. |
| 6,026,388 A | 2/2000 | Liddy et al. |
| 6,240,329 B1 | 5/2001 | Sun |
| 6,374,197 B1 | 4/2002 | Ganesh et al. |
| 6,442,639 B1 | 8/2002 | McElhattan et al. |
| 6,678,669 B2 | 1/2004 | Lapointe et al. |
| 6,728,687 B2 | 4/2004 | Arena et al. |
| 6,775,594 B1 | 8/2004 | Conigliaro et al. |
| 6,816,800 B2 | 11/2004 | Heiland |
| 6,934,735 B1 | 8/2005 | Emens et al. |
| 7,079,984 B2 | 7/2006 | Eryurek et al. |
| 7,130,770 B2 | 10/2006 | Di Palma et al. |
| 2002/0116243 A1 | 8/2002 | Mancisidor et al. |
| 2003/0065632 A1 | 4/2003 | Hubey |
| 2003/0198316 A1 | 10/2003 | Dewaele et al. |

(Continued)

FOREIGN PATENT DOCUMENTS

EP    1591951 A2    11/2005

OTHER PUBLICATIONS

Hadden,G.D. et al. "Shipboard Machinery Diagnostics and Prognostics/Condition Based Maintenance: A Progress Report". IEEE. 2000. pp. 277-292.*

(Continued)

*Primary Examiner* — Jeffrey A Gaffin
*Assistant Examiner* — Benjamin Buss
(74) *Attorney, Agent, or Firm* — Ingrassia Fisher & Lorenz, P.C.

(57) ABSTRACT

A method, system, and computer program product for predicting the functional availability of a complex system is provided. Parameters of the complex system are converted from a plurality of binary values to at least one prognostic vector. At least a portion of a binary input expression is converted into an equivalent fuzzy output expression, the fuzzy output expression operable on the at least one prognostic vector.

21 Claims, 7 Drawing Sheets

U.S. PATENT DOCUMENTS

| | | | |
|---|---|---|---|
| 2004/0210395 A1* | 10/2004 | Cheng et al. | 702/14 |
| 2005/0182582 A1 | 8/2005 | Chen | |
| 2005/0228619 A1* | 10/2005 | Burnet et al. | 702/189 |
| 2006/0047478 A1 | 3/2006 | Di Palma et al. | |
| 2006/0235707 A1* | 10/2006 | Goldstein et al. | 705/1 |
| 2007/0126561 A1* | 6/2007 | Breed | 340/426.13 |
| 2008/0034313 A1 | 2/2008 | Hildebrand | |

OTHER PUBLICATIONS

Byington, C.S. et al. "A Model-Based Approach to Prognostics and Health Management for Flight Control Actuators". 2004 IEEE Aerospace Conference Proceedings. 2004. pp. 3551-3562.*

Hadden, G.D. et al. "Application Challenges: System Health Management for Complex Systems". IPDPS 2000 Workshops, LNCS 1800, pp. 784-791, 2000.*

Hadden, G.D. et al. "Distributed Multi-Algorithm Diagnostics and Prognostics for US Navy Ships". AAAI Technical Report SS-02-03. AAAI. 2002. 8 pages.*

Rahmat, M.K. et al.; Reliability Estimation of Uninterruptible Power Supply Systems: Boolean Truth Table Method; Annual International Telecommunications Energy Conference, IEEE, PI, Sep. 1, 2006, pp. 1-6, XP031020309.

Bonissone, P.P. et al.; Soft Computing Applications to Prognostics and Health Management (PHM): Leveraging Field Data and Domain Knowledge; Computational and Ambient Intelligence, Springer Berlin Heidelberg, Jun. 20, 2007, pp. 928-939, XP019080531.

Jardine, A.K.S. et al.; A Review on Machinery Diagnostics and Prognostics Implementing Condition-Based Maintenance; Mechanical Systems and Signal Processing, London, Oct. 1, 2006, pp. 1483-1510, XP024930393.

EP Search Report, EP 09158293.2-1225/2141640 dated Feb. 8, 2010.

* cited by examiner

| ELEMENT | STATUS (CURRENT) | STATUS (IN 3 DAYS) | STATUS (IN 10 DAYS) |
|---|---|---|---|
| AMMO AVAILABILITY | 100% | 60% | 10% |
| FIRING ASSEMBLY STATUS | 100% | 35% | 20% |
| AMMO AUTO LOADER AVAILABILITY | 0% | 0% | 0% |
| AMMO MANUAL LOADER AVAILABILITY | 70% | 50% | 40% |

FIG. 3

| AMMOAVAILABILITY | FIRINGASSEMBLYSTATUS | AMMOAUTOLOADERAVAILABILITY | AMMOMANUALLOADERAVAILABILITY |
|---|---|---|---|
| $T_0$ 100% | $T_0$ 100% | $T_0$ 0% | $T_0$ 70% |
| $T_3$ 60% | $T_3$ 35% | $T_3$ 0% | $T_3$ 50% |
| $T_{10}$ 10% | $T_{10}$ 20% | $T_{10}$ 0% | $T_{10}$ 40% |

$$\begin{bmatrix} T_0 & 70\% \\ T_3 & 35\% \\ T_{10} & 10\% \end{bmatrix} = \text{MIN}\left( \begin{bmatrix} T_0 & 100\% \\ T_3 & 60\% \\ T_{10} & 10\% \end{bmatrix}, \text{MIN}\left( \begin{bmatrix} T_0 & 100\% \\ T_3 & 35\% \\ T_{10} & 20\% \end{bmatrix}, \text{MAX}\left( \begin{bmatrix} T_0 & 0\% \\ T_3 & 0\% \\ T_{10} & 0\% \end{bmatrix}, \begin{bmatrix} T_0 & 70\% \\ T_3 & 50\% \\ T_{10} & 40\% \end{bmatrix} \right) \right) \right)$$

PREDICTION OF FUNCTIONAL AVAILABILITY OF COMPLEX SYSTEM

STATEMENT REGARDING FEDERALLY SPONSORED RESEARCH OR DEVELOPMENT

This invention was made with Government support under Honeywell Project Number AZ19888 (PS-MRS) entitled "Future Combat Systems-Platform Soldier Mission Readiness System," and awarded by the U.S. Department of Defense under Prime Contract Number W56 HZV-05-C-0724, and Subcontract Number 3EC1893 and 5EC8407. The Government has certain rights in this invention.

FIELD OF THE INVENTION

The present invention generally relates to statistics, and more particularly but not exclusively, to a method, system, and computer program product for prediction of functional availability of a complex system.

BACKGROUND OF THE INVENTION

Vehicles are used in a variety of settings. For example, aircraft and spacecraft are used in aerospace settings, automobiles, buses, and trains are used in surface settings, and marine vehicles are used on or in marine environments. Health management systems are commonly employed in conjunction with vehicles and similar complex systems for monitoring purposes. Typically, the health management systems may monitor one particular aspect of the vehicle or complex system. The health management systems, however, are beginning to monitor more than one aspect of the vehicle with increasing frequency.

A common problem in the deployment of health management systems is the challenge of providing a function that determines a status of key functions of the vehicle of complex system based on a status of lower level functions, components, or consumables on which a higher level function depends. Commonly, this capability is provided through the evaluation of a complex logic expression, using values for the current status of the lower level functions, components, and/or consumables. The logic expression may be provided by system experts or through analysis of an analytic system model.

Evaluation of the logic expression described above may be sufficient for determining a current status of the function, but it does not provide an ability to predict future availability. Accordingly, a need exists for a mechanism to determine and compute the current and predicted value for the availability of key functions of a vehicle or other complex system, based on the current and predicted availability of its component elements. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

In one embodiment, by way of example only, a method for predicting the functional availability of a complex system is provided. Parameters of the complex system are converted from a plurality of binary values to at least one prognostic vector. At least a portion of a binary input expression is converted into an equivalent fuzzy output expression. The fuzzy output expression is operable on the at least one prognostic vector.

In another embodiment, again by way of example only, a system for predicting the functional availability of a complex system is provided. A prognostic vector generator is adapted for converting parameters of the complex system from a plurality of binary values to at least one prognostic vector. A fuzzy converter, in communication with the prognostic vector generator, is adapted for converting at least a portion of a binary input expression into an equivalent fuzzy output expression, the fuzzy output expression operable on the at least one prognostic vector.

In still another embodiment, again by way of example only, a computer program product for predicting the functional availability of a complex system is provided, the computer program product comprising a computer-readable storage medium having computer-readable program code portions stored therein. The computer-readable program code portions include a first executable portion for converting parameters of the complex system from a plurality of binary values to at least one prognostic vector, and a second executable portion for converting at least a portion of a binary input expression into an equivalent fuzzy output expression, the fuzzy output expression operable on the at least one prognostic vector.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

The present description and following claimed subject matter present exemplary system, method, and computer program product embodiments of a mechanism to predict functional availability of a vehicle or other complex system. The mechanism converts a logic expression associated with the vehicle of complex system and current status of dependent elements of the expression into a form that allows the prediction of the future availability of a higher level function. Such prognostic functionality allows for informed planning and related decision making to occur.

In some embodiments, the mechanism may implement functional modules to perform the aforementioned conversion, such as one or more prognostic generator modules for developing prognostic vectors. In addition, a fuzzy converter module may be employed to convert Boolean availability expressions to expressions operable on the prognostic vectors. In one embodiment, the fuzzy converter may utilize a methodology derived in part from fuzzy set theory. Finally, a fuzzy prediction evaluator may be employed to evaluate the converted expression in view of the prognostic vectors and generate a fused prognostic vector reflecting a prognosis for functional availability of the complex system. By feeding translated expression values of the current and predicted status of component elements of the complex system into the translated expressions, it is possible to determine current and forecasted availability of the complex system. The specific functionality and exemplary implementations of the functional modules will be further described following.

Figure 1:
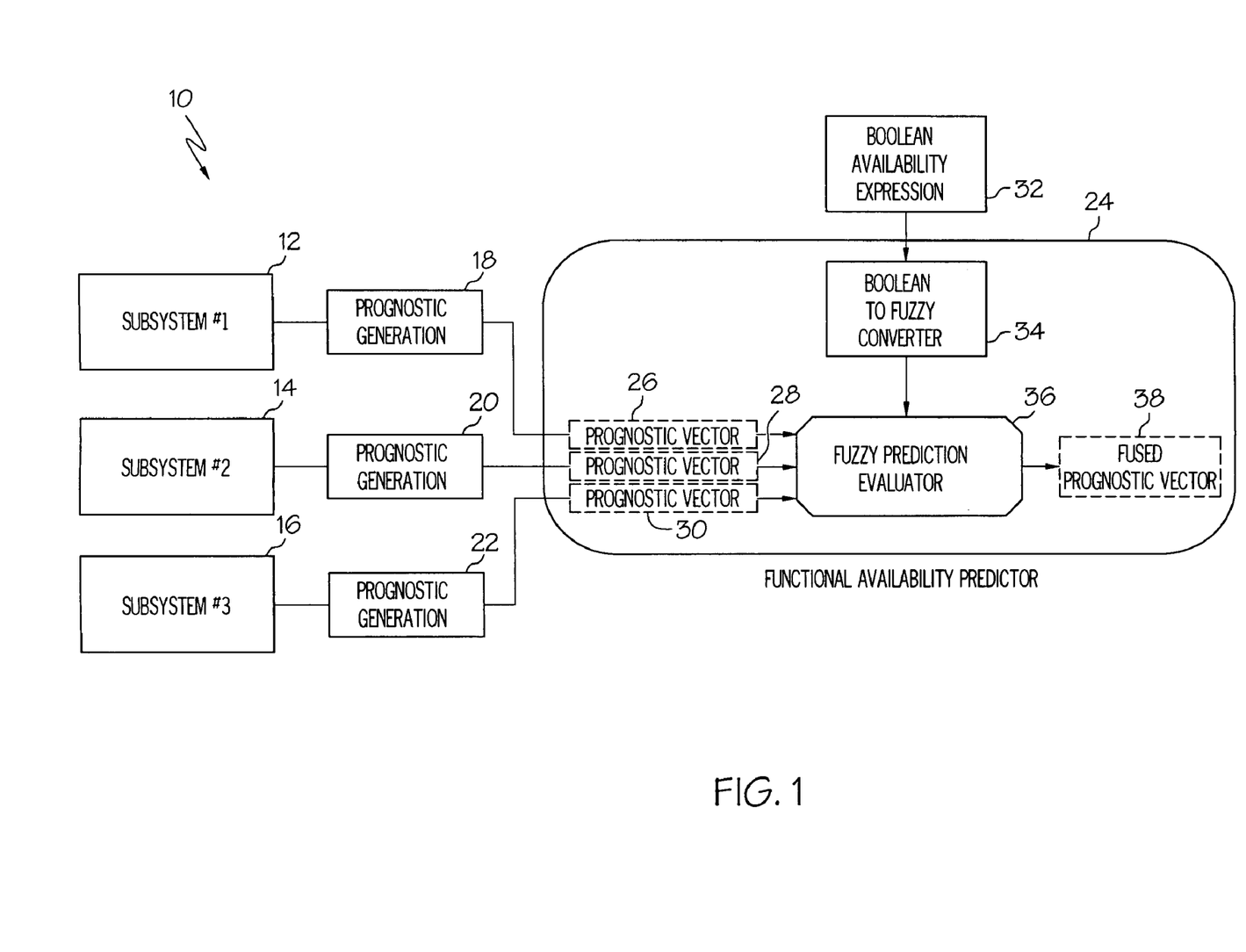
FIG. 1 illustrates an exemplary mechanism to predict functional availability of a complex system.

Turning to FIG. 1, an exemplary mechanism 10 for predicting functional availability of a complex system is depicted. Mechanism 10 depicts a number of functional modules in communication with one another as seen. In addition, mechanism 10 is in communication with three interrelated subsystems 12, 14, and 16, although the skilled artisan will appreciate that additional subsystems may also be evaluated in a particular implementation. Each of subsystem 12, 14, and 16 is shown in communication with a prognostic generation module 18, 20, and 22, for receiving parameters of the subsystem in binary (discrete) form, and converting and arranging the parameters into prognostic vector format. Accordingly, prognostic generation module 18 generates prognostic vector 26, prognostic generation module 20 generates prognostic vector 28, and prognostic generation module 22 generates prognostic vector 30.

Each of the prognostic vectors 26, 28, and 30 are fed into a functional availability predictor module 24 as shown. The functional availability predictor module 24 inputs prognostic vectors 26, 28, 30, along with a Boolean availability expression 32, which is converted from an input expression to a fuzzy output expression using converter module 34. A fuzzy prediction evaluator module 36 operates the converted fuzzy output expression on the prognostic vectors 26, 28, and 30 to generate a fused prognostic vector 38. Fused prognostic vector 38 provides current and forecasted functional availability of a particular complex system or vehicle as will be further described.

Consider the following example of calculating functional availability using the foregoing mechanism. It is desired to predict the functional availability of a particular military-use vehicle. The following Boolean expression may be initially provided, evaluating the ability of the vehicle to shoot:

$$\text{vehicleCanShoot}=\text{ammoAvailability and firingAssemblyStatus and (ammoAutoLoaderAvailability or ammoManualLoaderAvailability)} \quad (1).$$

Expression (1) indicates that this function requires ammunition and the firing assembly and the ability to load the gun using either the auto loader or the manual loader. A current status of this function may be computed by supplying the values for the three variables and evaluating the expression accordingly. For example, if the following values are obtained:
ammoAvailability=true,
firingAssemblyStatus=true,
ammoAutoLoaderAvailability=false, and
ammoManualLoaderAvailability=true,
then evaluating the values in expression (1):

$$\text{vehicleCanShoot}=\text{true and true and (false or true)}=\text{true.} \quad (2).$$

Figure 2:
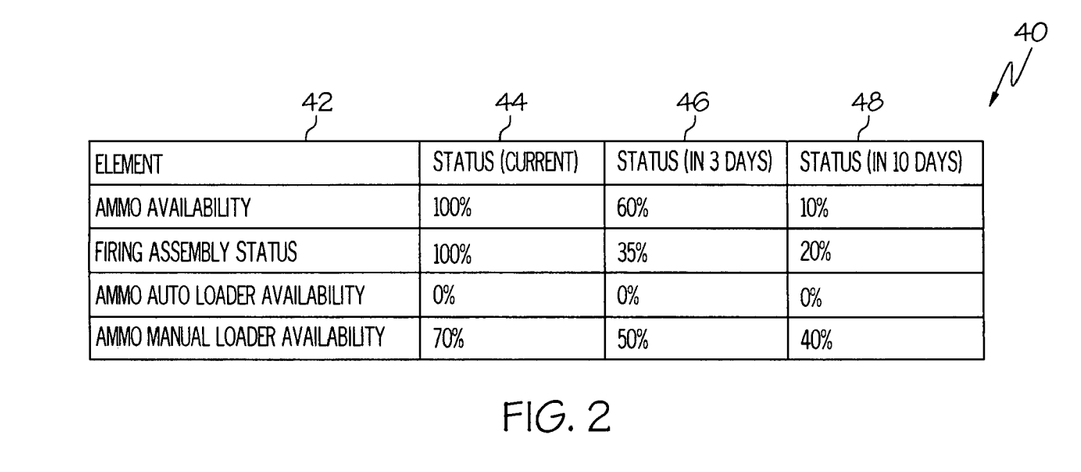
FIG. 2 illustrates exemplary data reflecting a current status of an element and a predicted status at specified future time intervals.

FIG. 2 illustrates the first step in an exemplary calculation of functional availability in light of the military-use vehicle example begun above. The status of lower level functions, components, and consumables (collectively denoted herein as "parameters") of the vehicle or complex system are converted and arranged as prognostic vectors instead of single, binary values. The depicted data 40 shown in FIG. 2 includes a series of elements 42 representative of lower level functions, components and consumables of the military-use vehicle. Accordingly, elements 12 include ammoAvailability element (representative of the availability of ammunition), firingAssemblyStatus element (representative of the status of the firing assembly), ammoAutoLoaderAvailability element (representative of the availability of the ammunition auto loader), and ammoManualLoaderAvailability element (representative of the availability of the ammunition manual loader).

Adjacent to the column containing elements 42 is the current status 44 of each respective element. For example, the availability of ammunition is currently 100%, while the availability of the ammunition auto loader is zero (the autoloader is inoperable). Adjacent to the current status 44 is the status in three days (46) of each respective element. For example, in the depicted embodiment, the availability of ammunition in three days is 60%, while the availability of the ammunition auto loader remains zero. Finally, adjacent to the status in three days (46) is the status in ten days (48) of the respective elements. The availability of ammunition in ten days is 10%, for example.

Figure 3:
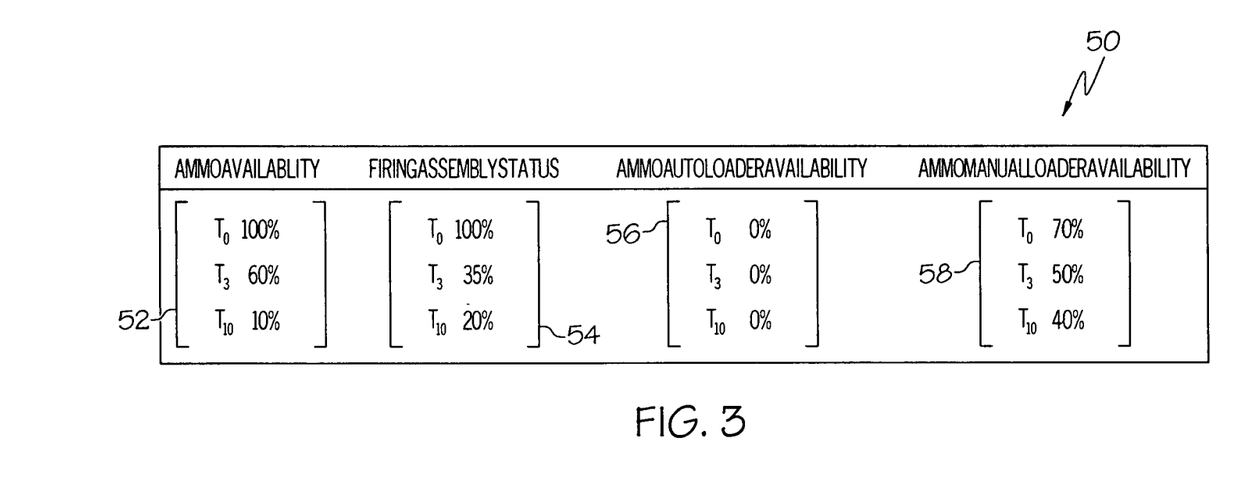
FIG. 3 illustrates the data of FIG. 2 encoded as prognostic vectors.

The data in FIG. 2 may be converted from single, binary values to a series of prognostic vectors representative of each element. In one embodiment, this conversion may occur through the use of one or more prognostic generation modules (FIG. 1). FIG. 3 illustrates a series 50 of four prognostic vectors 52, 54, 56, and 58, each representative of a particular element depicted in FIG. 2, previously. For example, prognostic vector 52 represents the element ammoAvailability, where the x, y, and z components of the vector 52 are the current status, the three day status, and the ten day status for the element (shown as $t_0$, $t_3$, and $t_{10}$). Accordingly, $t_0$, $t_3$, and $t_{10}$ for element ammoManualLoaderAvailability is 70%, 50%, and 40% respectively as seen in FIG. 2.

Each of the prognostic vectors 52, 54, 56, and 58 reveal prognostic information about the element the vectors 52, 54, 56 and 58 represents. For example, prognostic vector 52 representative of ammoAvailability is 100% at $t_0$, 60% at $t_3$, and 10% at $t_{10}$. This indicates that the consumable (ammunition) is currently available but is being depleted over time. Similarly, prognostic vector 54 indicates that the component (firing assembly) is currently operational but is likely to fail in the next few days, prognostic vector 56 indicates that this function (auto loader availability) is inoperable now and will not be repaired in the next ten days, and finally, prognostic vector 58 indicates that diagnostic functions for monitoring the health of this functionality (manual loader availability) show a 70% likelihood that the functionality is broken currently, and further, that the functionality is degrading.

Once the parameters of the complex system have been converted from binary values into the prognostic vectors, the applicable Boolean expression for the complex system is converted from a binary expression into an expression that can operate on the prognostic vectors. As previously described, a fuzzy converter module (FIG. 1) may be implemented to perform the conversion functionality. As part of the conversion functionality, a series of expression transforms (mappings) may be implemented that take a phrase from the Boolean input expression and covert it to a function in the output expression. In the present description, such a function is referred to as a fuzzy output expression, since principles derived from fuzzy set theory may be utilized to implement the expression transforms/mappings.

In one embodiment, expression transforms/mappings may include the following:

[Not (a)] mapped to [1−a], (3)

[And (a,b)] mapped to [min(a,b)], and (4)

[Or (a,b)] mapped to [max(a,b)], (5)

where a and b are vectors containing a current status of the parameters and a predicted status of the parameters at a specified future time interval expressed in a ratio between 0 representing a not available status and 1 representing certainly available status.

Figure 4:
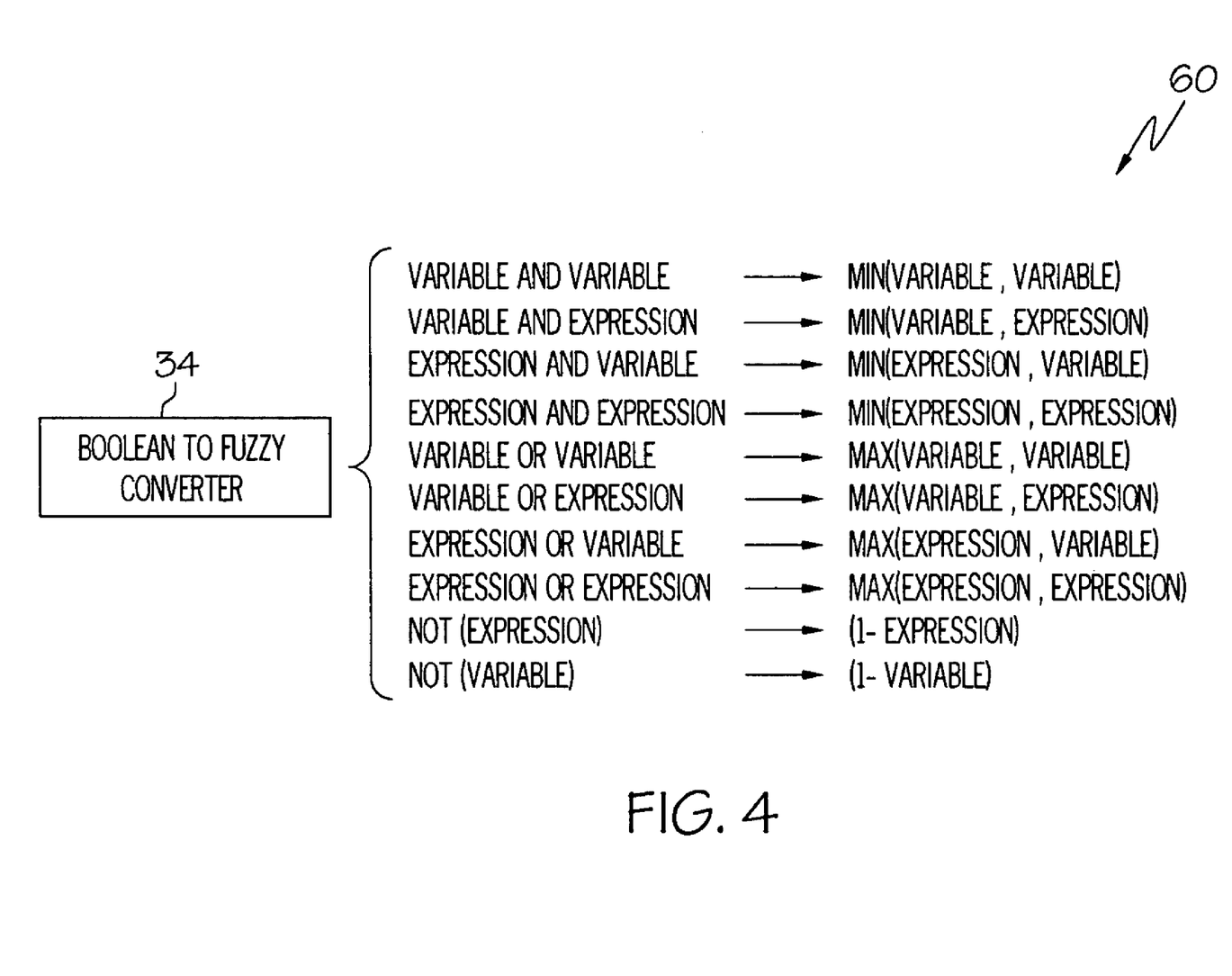
FIG. 4 illustrates an exemplary conversion of a binary input expression to a fuzzy output expression.
Figure 5:
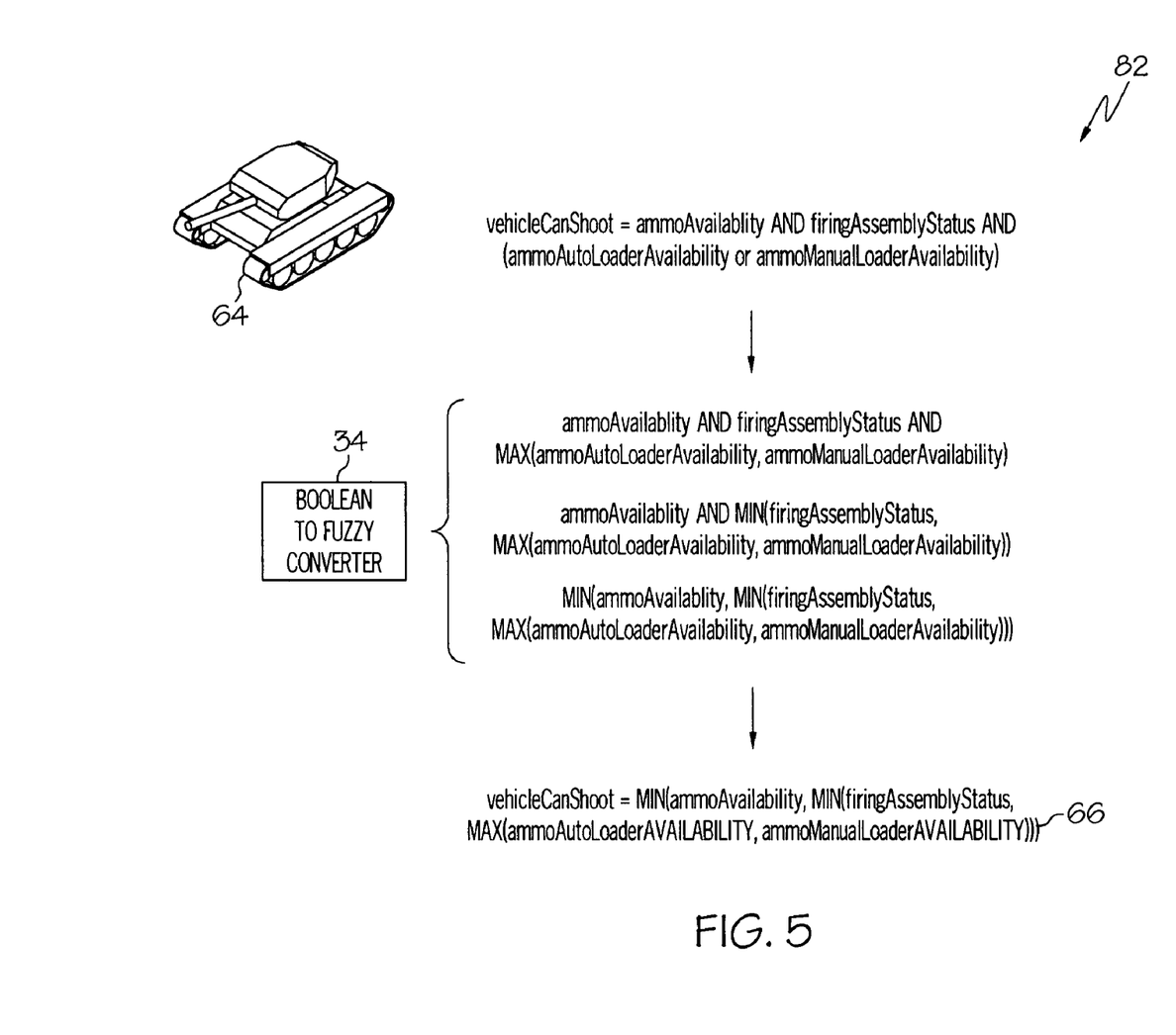
FIG. 5 illustrates an exemplary calculation of functional availability.

FIG. 4 illustrates several exemplary expression transforms 60 for mapping phrases from an input expression and conversion to an output expression function. For example, the Boolean operator and between two variables and/or expressions may be converted to the Min function for the variables/expressions. Similarly, the Boolean operator or between two variables and/or expressions may be converted to the Max function the variables/expressions. Finally, the Boolean operator Not for a particular expression or variable may be converted to (1−) the expression or the variable. The process of expression transformation may continue until each portion of a particular input expression has been converted FIG. 5, following, illustrates an exemplary calculation 62 of functional availability for the aforementioned military-use vehicle 64. The Boolean input expression for the vehicle is first shown prior to conversion. The fuzzy converter module is then implemented to convert each portion (phrase) of the Boolean input expression as shown. The end result is shown at the bottom of the Figure, where fuzzy output expression 66 is generated.

Figure 6:
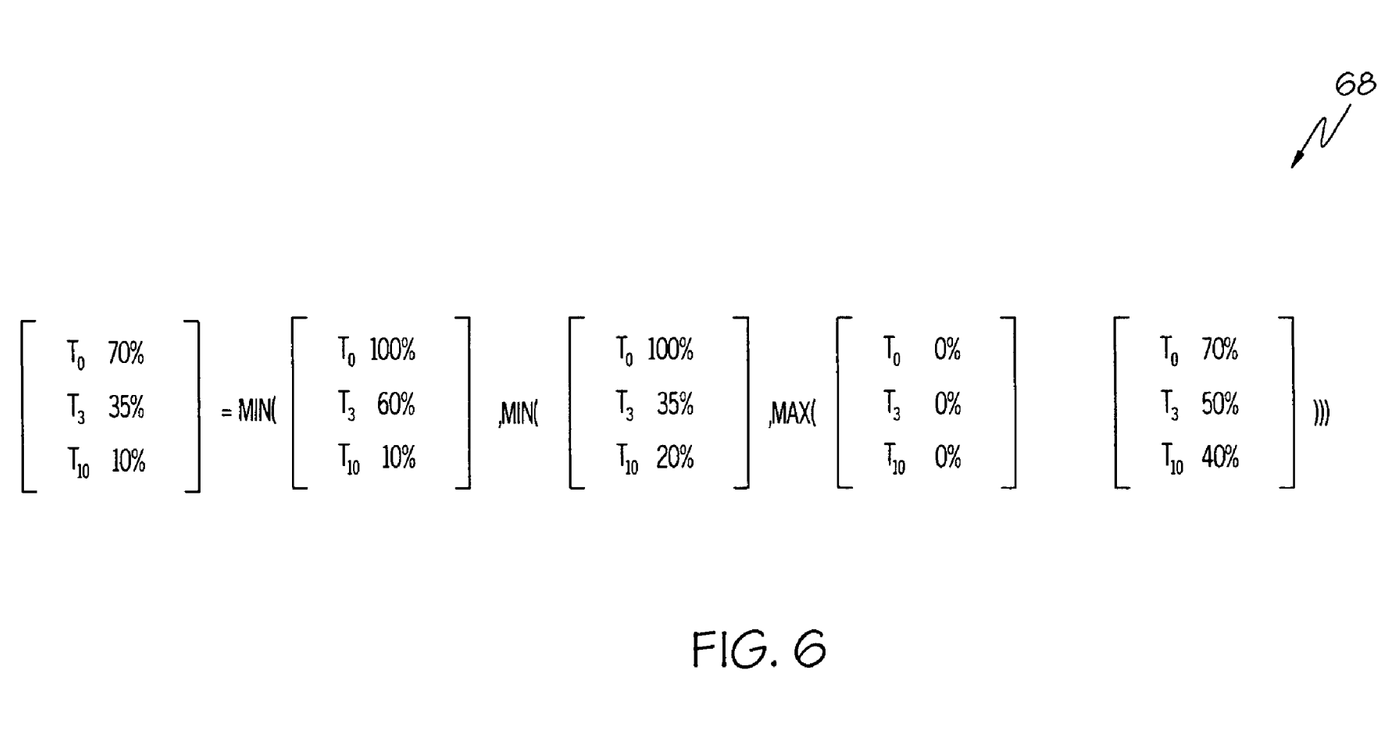
FIG. 6 illustrates an exemplary evaluation of prognostic vectors to generate a fused prognostic vector.

Once a particular fuzzy output expression is generated, the function may be evaluated using the prognostic vectors for its inputs. Inputting the prognostic vectors into the function yields a fused prognostic vector. Continuing the military-use vehicle example from above, an exemplary fused prognostic vector is depicted as the resultant vector of the fuzzy output expression 68 where the aforementioned prognostic vectors have been inputted. Examining the resultant vector, it may be seen that the current functional availability $t_0$ of the vehicle to shoot is 70%, or the minimum of the ammoAvailability element, the minimum of the firingAssemblyStatus element, and the maximum of the ammoAutoLoaderAvailability element and the ammoManualLoaderAvailability element.

Figure 7:
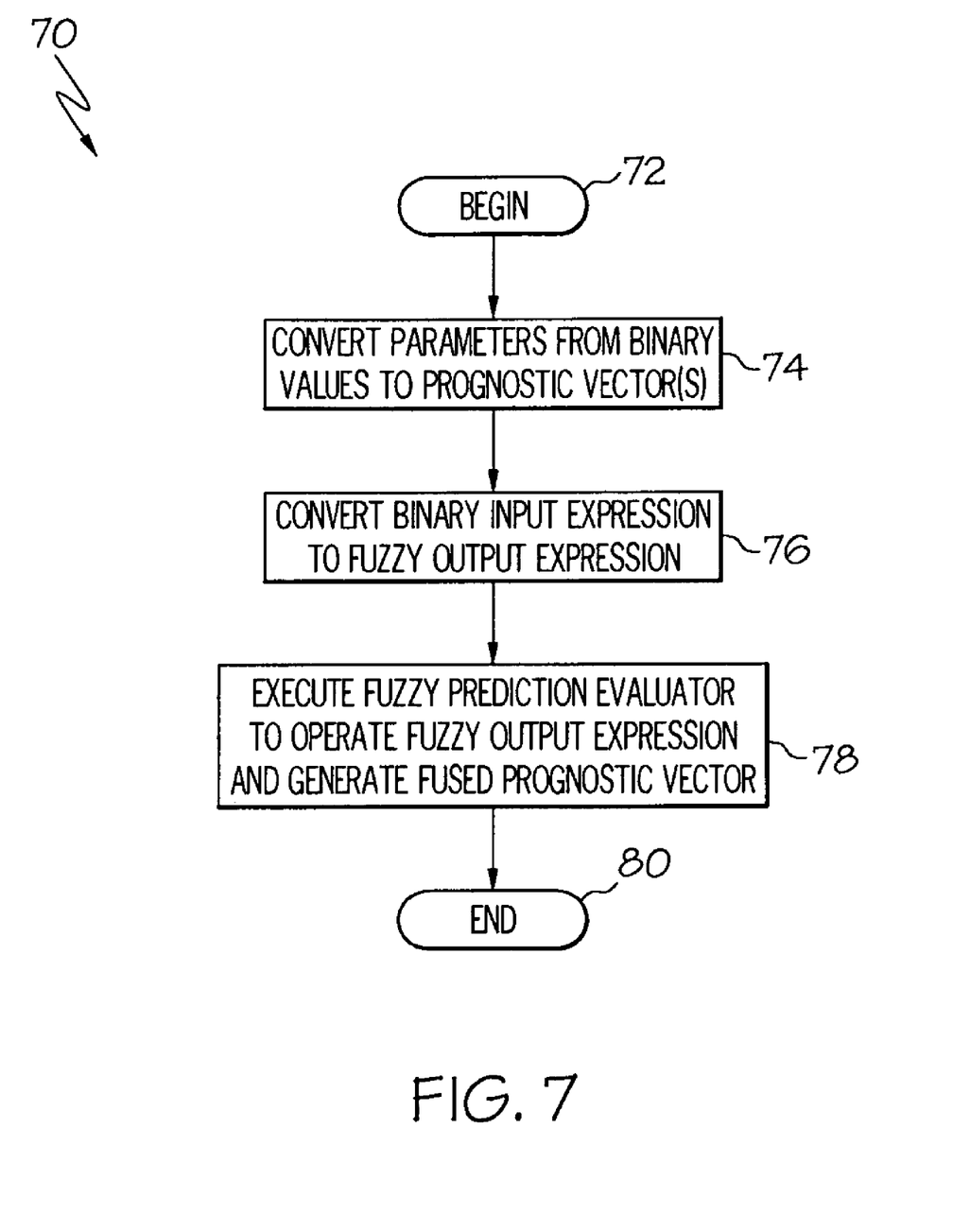
FIG. 7 illustrates an exemplary method for predicting functional availability of a complex system.

FIG. 7, following, illustrates an exemplary method 70 for predicting functional availability of a complex system As one skilled in the art will appreciate, various steps in the method 70 may be implemented in differing ways to suit a particular application. For example, various steps in the methods may be omitted, modified, or may be carried out in differing orders. In addition, various steps may be implemented by differing means, such as by hardware, firmware, or software, or a combination thereof operational on, or associated with, the webservice architecture. For example, the methods may be embodied in computer program products, such as digital versatile discs (DVDs) compact discs (CDs) or other storage media. The computer program products may include computer readable program code having executable portions for performing various steps as illustrated in the following method 70.

Method 70 begins (step 72), with the conversion of parameters of the complex system from binary values to prognostic vectors (step 74). The applicable binary input expression is then converted to a fuzzy output expression (step 76). The fuzzy prediction evaluator is then executed to operate the fuzzy output expression on the prognostic vectors and generate a fused prognostic vector (step 78). The method 70 then ends (step 80).

Figure 8:
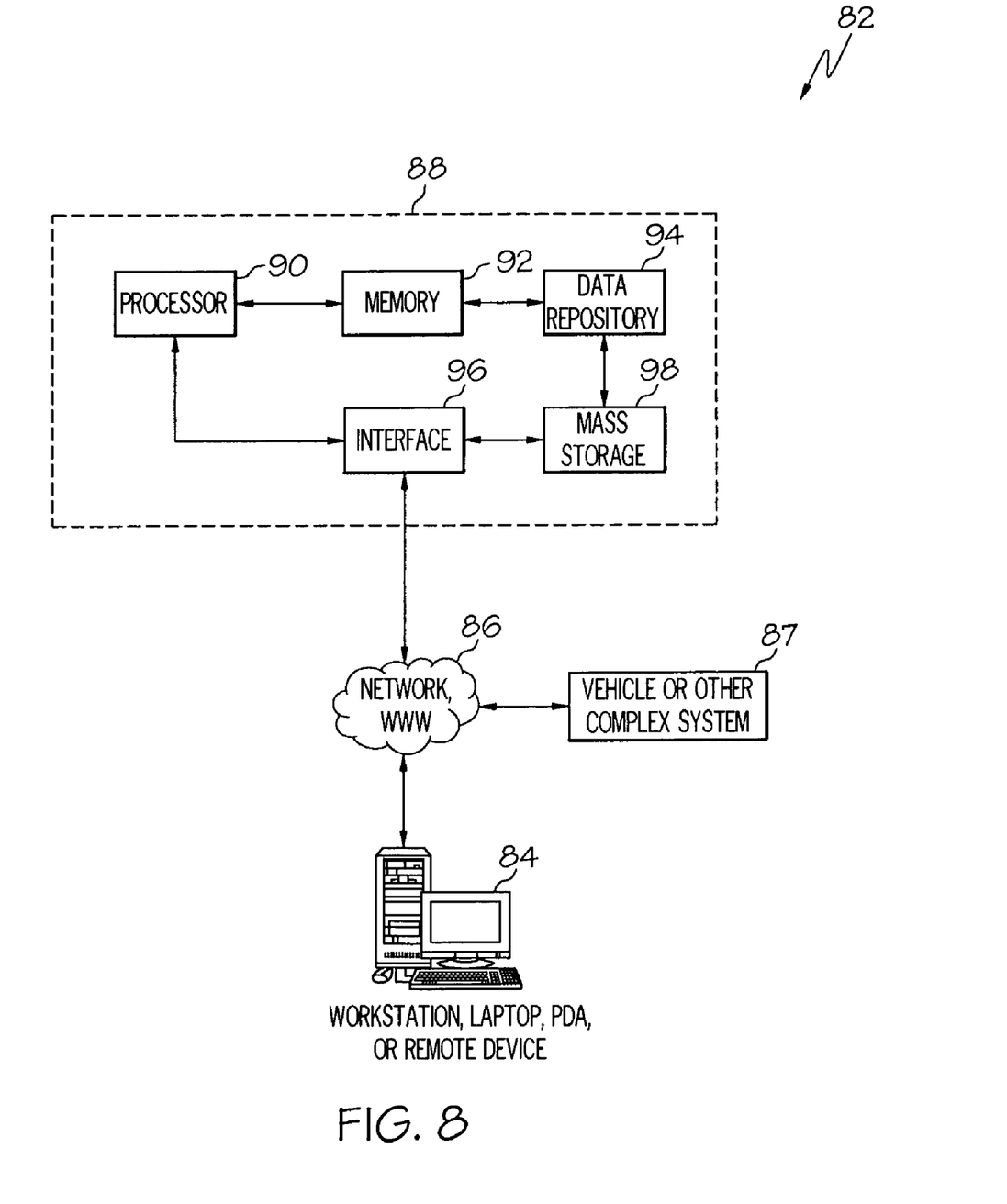
FIG. 8 illustrates an exemplary computing environment for implementing aspects of the mechanism depicted in FIG. 1.

FIG. 8, following, illustrates an exemplary computing environment 82 in which various aspects of the previous description and following claimed subject matter may be implemented. Computer workstation 84, laptop 84, PDA 84, remote device 84, or a similar device is connected to a network 86. Network 86 can include an intranet, an extranet, and similar network connectivity to other computer devices such as the world wide web (WWW). A server 88 having a connection to network 86 includes an interface 96, a processor 90, memory 92, data repository 94, and mass storage 98. As one skilled in the art will appreciate, the components of server 88 may vary from application to application. In addition, more than one server 88, or the components thereof, may be connected to network 86 in a particular implementation. Data repository 24 may include one or multiple databases, locations, configurations, protocols, mediums, and the like. In one embodiment, for example, prognostic vector generator modules 18, 20, and 22, as well as fuzzy converter 34 (FIG. 1) may be implemented, at least in part, through the use of processor 90. The skilled artisan will appreciate that much of the functionality depicted in mechanism 10 (FIG. 1) may be implemented in computing environments such as the depicted environment 82.

A vehicle or other complex system 87 is also coupled to the network 86. Vehicle 87 may also include such components as an interface, processor, memory, and mass storage as one skilled in the art will appreciate. Such components are not illustrated for purposes of convenience. In addition, a number of vehicles 87 may be connected across the network 86. For example, a first vehicle 87 may be located in a first location. A second vehicle 87 may be located across network 86 in a second location, and so forth.

Device 84 uses hardware, software, firmware, or a combination thereof to access network 86, vehicle 87, and server 88. A user, for example, may execute a web browser which executes software on the workstation and queries the vehicle 87 and/or server 88 for prediction data generated from executing method 70 (FIG. 7). The data may be read from mass storage device 98 and provided through interface 96 and network 86 to workstation 84 where it is displayed to the user as part of a graphical user interface (GUI) on a suitable display device such as a monitor.

Some of the functional units described in this specification have been labeled as "modules" in order to more particularly emphasize their implementation independence. For example, functionality labeled as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for predicting the functional availability of a vehicle having a plurality of subsystems, comprising:
    generating, by each of the plurality of subsystems, a plurality of binary values corresponding to the functional availability of the respective subsystem;
    converting, by a plurality of prognostic generation modules each coupled to one of the plurality of subsystems, parameters for their respective subsystem from the plurality of binary values to a plurality of prognostic vectors, each corresponding to one of the plurality of subsystems;
    converting, by an availability prediction module, at least a portion of a Boolean availability expression into an equivalent fuzzy output expression, the fuzzy output expression operable on the plurality of prognostic vectors; and
    predicting, by the availability prediction module, the functional availability of the vehicle based upon the plurality of prognostic vectors and the fuzzy output expression.

2. The method of claim 1, further including operating the fuzzy output expression on the plurality of prognostic vectors to generate a fused prognostic vector.

3. The method of claim 1, wherein converting parameters for their respective subsystem from the plurality of binary values to a plurality of prognostic vectors includes encoding both of a current status of the parameters and a predicted status of the parameters at a specified future time interval.

4. The method of claim 1, wherein converting at least a portion of the Boolean availability expression into an equivalent fuzzy output expression includes implementing at least one expression transform taking a phrase from the Boolean availability expression and converting the phrase to a function in the fuzzy output expression.

5. The method of claim 4, further including repeating the implementing at least one expression transform taking a phrase from the Boolean availability expression and the converting the phrase to a function in the fuzzy output expression until each portion of the Boolean availability expression has been converted.

6. The method of claim 4, wherein converting at least a portion of the Boolean availability expression into an equivalent fuzzy output expression includes implementing a plurality of mappings between a Boolean form represented in the Boolean availability expression into a statistical form represented in the fuzzy output expression.

7. The method of claim 6, wherein implementing a plurality of mappings between a Boolean form represented in the Boolean availability expression into a statistical form represented in the fuzzy output expression includes implementing at least one of:

[Not (a)] mapped to [1-a],

[And (a,b)] mapped to [min(a,b)], and

[Or (a,b)] mapped to [max(a,b)], where a and b are vectors containing a current status of the parameters and a predicted status of the parameters at a specified future time interval expressed in a ratio between 0 representing a not available status and 1 representing certainly available status.

8. A system for predicting the functional availability of a vehicle having a plurality of subsystems, comprising:
    a plurality of prognostic vector generators, each prognostic vector generator coupled to one of the plurality of subsystems, adapted for converting binary values corresponding to parameters of each subsystem to at least one prognostic vector;
    a fuzzy converter, in communication with the plurality of prognostic vector generators, adapted for converting at least a portion of a Boolean availability expression into an equivalent fuzzy output expression, the fuzzy output expression operable on the at least one prognostic vector; and
    an availability prediction module in communication with the fuzzy converter and the plurality of prognostic vector generators, configured to predict the functional availability of the vehicle based upon the at least one prognostic vectors and the fuzzy output expression.

9. The system of claim 8, wherein the fuzzy prediction evaluator is further configured to operate the fuzzy output expression on the at least one prognostic vector to generate a fused prognostic vector.

10. The system of claim 8, wherein the prognostic vector generator is further adapted for encoding both of a current status of the parameters and a predicted status of the parameters at a specified future time interval.

11. The system of claim 8, wherein the fuzzy converter is further adapted for implementing at least one expression transform taking a phrase from the Boolean availability expression and converting the phrase to a function in the fuzzy output expression.

12. The system of claim 11, wherein the fuzzy converter is further adapted for repeating the implementing at least one expression transform taking a phrase from the Boolean availability expression and the converting the phrase to a function in the fuzzy output expression until each portion of Boolean availability expression has been converted.

13. The system of claim 11, wherein the fuzzy converter is further adapted for implementing a plurality of mappings between a Boolean form represented in the Boolean availability expression into a statistical form represented in the fuzzy output expression.

14. The system of claim 13, wherein the fuzzy converter is further adapted for implementing at least one of:

[Not (a)] mapped to [1-a],

[And (a,b)] mapped to [min(a,b)], and

[Or (a,b)] mapped to [max(a,b)], where a and b are vectors containing a current status of the parameters and a predicted status of the parameters at a specified future time interval expressed in a ratio between 0 representing a not available status and 1 representing certainly available status.

15. A computer program product for predicting the functional availability of a complex system, the complex system including a plurality of subsystems, the computer program product comprising a computer-readable storage medium having computer-readable program code portions stored therein, the computer-readable program code portions comprising:

a first executable portion for converting parameters generated by each of the plurality of subsystems from a plurality of binary values to at least one prognostic vector;

a second executable portion for converting at least a portion of a Boolean availability expression into an equivalent fuzzy output expression, the fuzzy output expression operable on the at least one prognostic vector; and a third executable portion predicting the functional availability of the complex system based upon the at least one prognostic vector and the fuzzy output expression.

16. The computer program product of claim 15, wherein the third executable portion is further configured for operating the fuzzy output expression on the at least one prognostic vector to generate a fused prognostic vector.

17. The computer program product of claim 15, wherein the first executable portion for converting parameters of the complex system from a plurality of binary values to at least one prognostic vector includes a third executable portion for encoding both of a current status of the parameters and a predicted status of the parameters at a specified future time interval.

18. The computer program product of claim 15, wherein the second executable portion for converting at least a portion of a Boolean availability expression into an equivalent fuzzy output expression includes a third executable portion for implementing at least one expression transform taking a phrase from the Boolean availability expression and converting the phrase to a function in the fuzzy output expression.

19. The computer program product of claim 18, further including a fourth executable portion for repeating the implementing at least one expression transform taking a phrase from the Boolean availability expression and the converting the phrase to a function in the fuzzy output expression until each portion of the Boolean availability expression has been converted.

20. The computer program product of claim 18, wherein second executable portion for converting at least a portion of a Boolean availability expression into an equivalent fuzzy output expression includes a fourth executable portion for implementing a plurality of mappings between a Boolean form represented in the Boolean availability expression into a statistical form represented in the fuzzy output expression.

21. The computer program product of claim 20, wherein the fourth executable portion for implementing a plurality of mappings between a Boolean form represented in the Boolean availability expression into a statistical form represented in the fuzzy output expression includes a fifth executable portion for implementing at least one of:

[Not (a)] mapped to [1-a],

[And (a,b)] mapped to [min(a,b)], and

[Or (a,b)] mapped to [max(a,b)], where a and b are vectors containing a current status of the parameters and a predicted status of the parameters at a specified future time interval expressed in a ratio between 0 representing a not available status and 1 representing certainly available status.

* * * * *